United States Patent [19]
Nightingale

[11] 3,985,155
[45] Oct. 12, 1976

[54] PLUG VALVES

[75] Inventor: Douglas Daniel John Nightingale, St. Albans, England

[73] Assignee: Imperial Chemical Industries Limited, London, England

[22] Filed: June 6, 1975

[21] Appl. No.: 584,531

[30] Foreign Application Priority Data
June 25, 1974 United Kingdom............... 28100/74

[52] U.S. Cl..................... 137/625.48; 137/625.46; 251/309; 251/324
[51] Int. Cl.² ..................... F16K 11/06; F16K 3/00
[58] Field of Search ........... 251/214, 215, 172, 309, 251/DIG. 1, 324; 137/625.17, 625.4, 625.46, 625.47, 625.48, 625.69, 625.21

[56] References Cited
UNITED STATES PATENTS

| | | |
|---|---|---|
| 3,062,496 | 11/1962 | Stehlin............................ 251/324 X |
| 3,532,123 | 10/1970 | Anthony......................... 251/172 X |
| 3,538,952 | 11/1970 | Bayer............................. 137/625.17 |
| 3,589,677 | 6/1971 | Segers................................. 251/215 |
| 3,612,479 | 10/1971 | Smith........................... 251/DIG. 1 |
| 3,747,479 | 7/1973 | Nightingale et al................. 251/214 |

*Primary Examiner*—Alan Cohan
*Assistant Examiner*—Gerald A. Michalsky
*Attorney, Agent, or Firm*—Cushman, Darby & Cushman

[57] ABSTRACT

A plug valve having radial ports has a spindle comprising a mandrel having around it a plastics sleeve with integral upstanding ridges biased against the bore to form seals which subdivide the space between the sleeve and the bore and define the flow passages for alignment with selected ports to permit fluid flow therebetween. The valve may be a multiway valve or simply an on/off valve.

8 Claims, 5 Drawing Figures

PLUG VALVES

The invention relates to plug valves, and especially to plastics-surfaced spindles for such valves which can be easily and cheaply manufactured for controlling fluids in e.g. laboratory glassware.

Plug valves comprise a body having a cylindrical bore with at least two radial ports communicating with the bore, and a spindle slideable axially and/or rotationally within the bore, the spindle having means for providing flow passages between selected ports. Flow passages in plug valves have previously comprised a hole through the spindle, or a channel formed in the outer surface of the spindle, or a combination of the two. The spindles have sometimes been made from plastics material, at least in so far as those parts of the spindle surface making sealing contact with the bore, but these have generally been either restricted in their ability to seal against high pressure differentials (whether between unconnected ports within the valve or between the inside of the valve and its surroundings), or when designed for containing high pressure fluid, their sophisticated sealing means have made them too expensive to be competitive with the mass produced valves at the cheaper end of the market in applications where the latter are sufficient for most of the reuirements asked of them. To improve the seals of the cheaper valves, modifications such as the provisions at the ends of the plugs of multiple ribs, have been suggested, but while these might be effective in reducing the leak rate of fluids from inside the valve to the surroundings, they do not prevent leakage between unconnected ports or non-communicating flow passages between which similar pressure differentials can occur.

According to the present invention there is provided a plug value comprising a spindle located within the bore of a valve body, in which the spindle comprises a mandrel having around it a plastics sleeve with integral upstanding ridges standing proud of the rest of the sleeve surface between the ridges, each ridge overlaying a resilient substrate between the mandrel and the sleeve, the free diameter of the spindle being greater than the diameter of the bore so that when the spindle is assembled in the bore the resilient substrate becomes compressed and biases the ridges against the bore to form sliding seals between the spindle and the bore, the diameter of the spindle in the areas between the ridges being less than the diameter of the bore to provide space for fluid to flow therebetween when passing from one port to another, the configuration of the ridges being arranged to divide said space between the spindle and the bore and define at least one discrete passage alignable with selected ports to permit fluid flow therebetween.

The ridges are preferably all narrow and of the same width so as to provide a good seal at each ridge and to provide all the ridges with a similar sealing ability. Where the ridges contact the bore, a contact width of about 1 mm has been found to give good seals with a polypropylene sleeve. Variation between 0.5 mm and 2 mm does not seem to reduce the seal unduly.

Using preformed sleeves with an internal diameter equal to or preferably slightly less (e.g. 1–3 percent) than the diameter of the mandrel and substrate, the spindles may be manufactured by stretching the sleeve over the mandrel with its resilient substrate in place. Thus for example a polytetrafluoroethylene sleeve may be preformed, warmed, and then slid onto the mandrel and substrate by hand. A preferred method for manufacturing the spindle comprises injection moulding a thermoplastic sleeve around the mandrel and resilient substrate, the mould being shaped to provide the sleeve with integrally-moulded ridges in appropriate places. This gives the designer a much freer choice of seal configuration. Suitable thermoplastics for injection moulding the sleeve include, for example, polyethylene, polypropylene, nylon and tetrafluoroethylene-hexafluoropropylene copolymers. Whether the sleeve is preformed or injection moulded, the material used must be inert to the fluid to be passed through the valve since the sleeve must necessarily come into contact with that fluid. For many operations, sleeves of readily formable materials such as polyolefins and nylons, may be used, but for general application where inertness to a wide spectrum of fluids is required, the more inert fluorine-containing polymers are preferred.

To obtain the seals, the valve spindle is used with a valve body whose bore diameter is less than the free diameter of the ridges (i.e. the diameter when free of the bore), so that in the assembled valve the resilient substrate underlying each ridge becomes compressed and urges its overlying ridge firmly against the valve body. The discrepancy between the two diameters which is required for adequate sealing in any specific application depends on the resilience of the inserts, the pliability of the ridges, the efficiency of sealing required, and on the degree of uniformity in the diameter of the valve body over the part traversed. Thus for example, a valve body formed from a plain glass tube may require a greater average discrepancy than one formed from precision bore shrunk glass tubing. As an example of the order of discrepancy required, with a polypropylene sleeve and a rubber substrate, we have obtained a good seal with a spindle whose free diameter was 0.430 inch in a valve body whose bore diameter was 0.415 inch, i.e. a spindle having a free diameter about 0.015 inch greater than the bore diameter.

The present invention may be used in providing a valve having a multiway function giving a choice of flow paths, or simply valves whose sole function is to provide on/off control.

Multiway valves require at least three radial ports communicating with the bore, and the ridges are arranged to provide at least one passage for interconnecting selected ports. Unconnected ports may be vented to the surrounding atmosphere, but for most purposes it is preferred to seal the fluids within the valve by providing ridges to form terminal seals outside all the ports, with intermediate ridges to divide the space between the spindle and the bore as bounded by the terminal seals, into at least two discrete flow passages.

The present invention is particularly suited to the provision of relatively cheap but efficient valves for laboratory glassware. The valve body may then suitably be formed of glass compatible with the glass employed in the remainder of the apparatus. However, other rigid materials may likewise be used as appropriate to the materials of apparatus into which it may be incorporated. For example the body may be moulded from rigid thermoplastics inert to the fluid to be controlled, the thermoplastics being reinforced, e.g. with glass fibres, as appropriate.

The present valves provide a number of advantages over earlier plug valves in which the flow passages were formed as channels in the surface. For example, by applying the sealing pressure over the narrower area of the ridges, a more efficient seal may be obtained. By forming all the seals in the same way using ridges of similar dimensions, the improvement in sealing efficiency is uniform. Thus for example an improvement in the efficiency of gland seals at the ends of the plug is not obtained at the expense or the ignoring of seals between adjacent flow passage. The lower friction for a given sealing pressure enables the wider choice of plastics materials to be used. Thus whereas the relatively expensive polytetrafluoroethylene was previously necessary to reduce friction to a tolerable level, other cheaper materials can be selected for use in the present valves (where the nature of the fluids permits) without necessarily rendering them unusably stiff in operation. By forming the sealing ridges as part of a continuous sleeve instead of an individual O-rings or the like, the number of possible leakage paths is halved, and the leak rate is consequently reduced. This can be important where high pressure differentials are required. Furthermore the protection afforded by the continuous sleeve enables the most appropriate resilient substrate materials to be used for providing the sealing pressure, irrespective of the fluids flowing or intended to flow through the valve. The pressure applied by the ridges against the bore is a radial pressure, and by using a central mandrel to stabilise the spindle, the radial sealing pressure is generally maintained rather than becoming dissipated as an axial stretching force. Moreover, by injection moulding the sleeves, the valve spindles can be cheaply mass produced while providing reproducability in sealing pressure for any given bore diameter.

The invention is illustrated by reference to specific embodiments thereof shown in the accompanying drawings by way of example. In the drawings.

Figure 1:
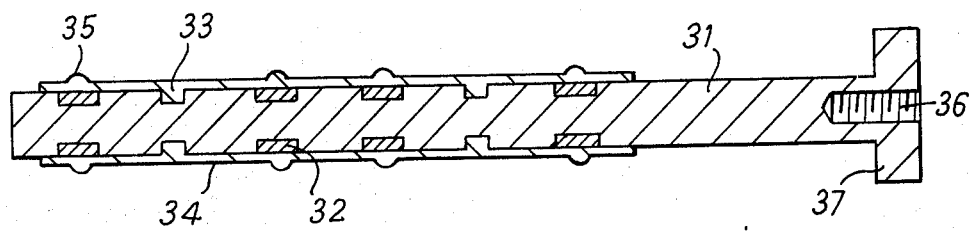
FIG. 1 is a section through a spindle having a plurality of ridges.
Figure 2:
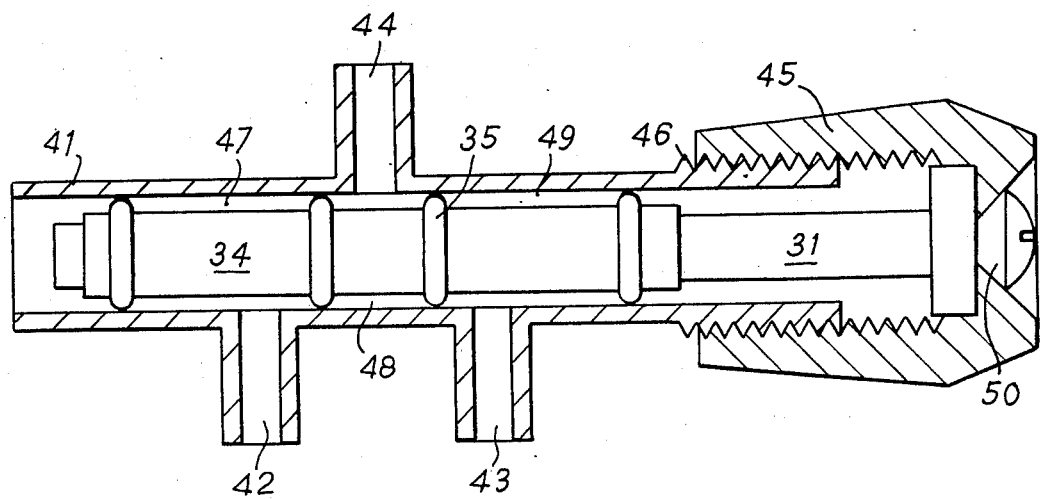
FIG. 2 is a part section through a multiway valve incorporating the spindle of FIG. 1, the valve being operable by linear motion of the spindle axially along the bore.

The spindle illustrated in FIG. 1 comprises a mandrel 31 with a resilient substrate in the form of four rectangular sectioned annular rubber inserts 32 let into annular grooves around the mandrel so as to be flush with the surface of the mandrel. The mandrel has further grooves 33. Around the mandrel and its rubber inserts is a protective sleeve 34 having four annular ridges 35, one overlying each of the four rubber inserts 32. One end 36 of the spindle is drilled and tapped, and has a shoulder 37 extending outwards on both sides. The spindle as manufactured by fitting the rubber inserts into their grooves in the mandrel, placing the mandrel with its inserts into a cylindrical mould having four annular channels such that the channels overlay the inserts. Molten polypropylene was then injected into the mould to form the sleeve. During moulding, the polypropylene flowed into the vacant annular grooves 33 to provide a key to prevent the sleeve from sliding off the mandrel. In FIG. 2, the spindle is shown located within the bore of a valve body 41 having three radial ports 42, 43, 44. On the end of the spindle is mounted a cap 45 having screw threads which engage corresponding threads 46 on the outer wall of the body. The cap is a tight fit over the shoulders 37 which prevent relative rotation between the spindle and the cap, and is held in place by a screw 50.

The diameter of the sheath (other than its ridges) is less that the bore diameter so that fluid may flow through the space between them. However, the diameter of the bore is less than the free diameter of the ridges, i.e. before insertion, so that when the spindle is inserted into the bore, each of the ridges is individually biased against the bore to form a seal, by its underlying rubber insert and the space between the spindle and the body is thereby divided into three separate flow passages 47, 48, 49. In the position depicted in FIG. 2, the valve is closed, none of these flow passages being aligned with more than one port. Rotation of the cap in one direction withdraws the spindle until the end flow passage 47 is aligned with both ports 42, 44, and so fluid can flow between them. The middle flow passage 48 is aligned with the other port 43 only, so that port remains closed. Rotation of the cap 45 in the other direction returns the spindle to the position shown in FIG. 2, further rotation pushing the spindle further into the body until flow passage 49 is aligned with both ports 43, 44, thereby permitting the flow of fluid between them. In that position, the other port 42 remains closed, being aligned with flow passage 48 which does not communicate with any other port. It will be appreciated that in this valve, although all four seals are formed in the same manner, their purposes are not identical, the two outer seals preventing escape of the fluid outside the valve and hence ensuring that the mandrel is isolated from the fluid by the sleeve, the inside two seals serving to divide the space enclosed between the spindle and the bore into discrete flow passages.

By providing more intermediate seals, further radial ports may be accommodated in more complex valves, as required. In the valve illustrated, if one of the intermediate seals were removed, a two way valve is provided in which port 44 may be connected to either port 42 or port 43, but no effective stop position is provided. In the valve illustrated, the spindle rotates with the cap because of shoulders 37. This rotation may have the effect of distributing around the ridges, any wear which may occur as the ridges cross the ports, but as will clearly be seen, it is not essential to the operation of the valve that the spindle rotates and the cap may be secured to the spindle by a rotatable connection which allows the cap to rotate without the spindle rotating, if desired.

Figure 3:
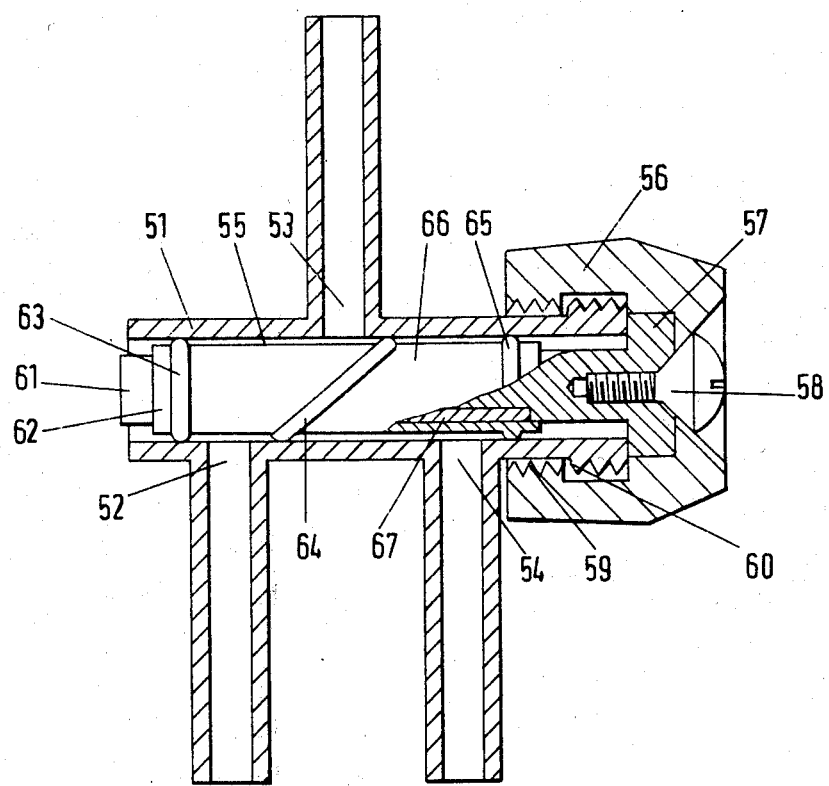
FIG. 3 is a section through a further multiway valve operable by rotation of the spindle within the bore.

The valve of FIG. 3 comprises a body 51 having three radial ports 52, 53, 54 communicating with a cylindrical bore 55. The spindle comprises a mandrel 61 and a sleeve 62 having three ridges 63, 64, 65 standing proud of the rest of the surface 66 of the sleeve. Between the sleeve and the mandrel is a tubular rubber substrate 67 extending sufficiently to underlie all the three ridges 63, 64, 65. At the end of the spindle is mounted a cap 56 fitted over shoulders 57 and secured by an axial screw 58. The end of the valve body and the inner wall of the cap are provided with co-operable screw threads 50, 60. These screw threads are both very short, about 2–3 turns being shown for clarity but a single turn would be adequate. The cap is mounted on the end of the body by screwing it forwards until the two screw threads have passed each other, the shoulders 57 then being adjacent the end of the body, i.e. in the position shown in FIG. 3.

The ridges are again oversize with respect to the bore so that the underlying rubber substrate 67 is compressed, and thereby biases the ridges against the bore to form seals. The outermost 63, 65 of the ridges provide limits to the space between the spindle surface 66 and the bore, while the intermediate seal 64 divides up the enclosed space into two flow passages. In the position shown in FIG. 3 the upper port 53 is connected to one lower port 52 by the left hand flow passage. Rotation of the spindle through 180° aligns the other flow passage with the upper port 53, thereby interconnecting it with the other lower port 54.

Because the screw threads on the cap and body are disengaged, rotation of the spindle does not produce any linear motion. By gently pressing the spindle cap towards the body when effecting rotation, so that the shoulders 57 are held against the end of the body, the position of the seals with respect to the body, is well maintained, and re-engagement of the screw threads is avoided. A spring may be provided to bias the shoulders against the body if desired, e.g. in the manner used to bias tapered stop cocks in burettes. In this rotary operable valve, there is no "off" position, but one may be provided by the provision of a further intermediate ridge parallel to that 64 shown, the oblique ridges being spaced apart to provide a space therebetween which is alignable with the upper port only. These intermediate ridges may be spaced further apart when there is linear movement during operation of the valve in addition to the rotary motion, e.g. by using a long threaded cap as used on the valve shown in FIG. 2, and this linear movement renders the positioning of the spindle for the off position less critical.

Figure 4:
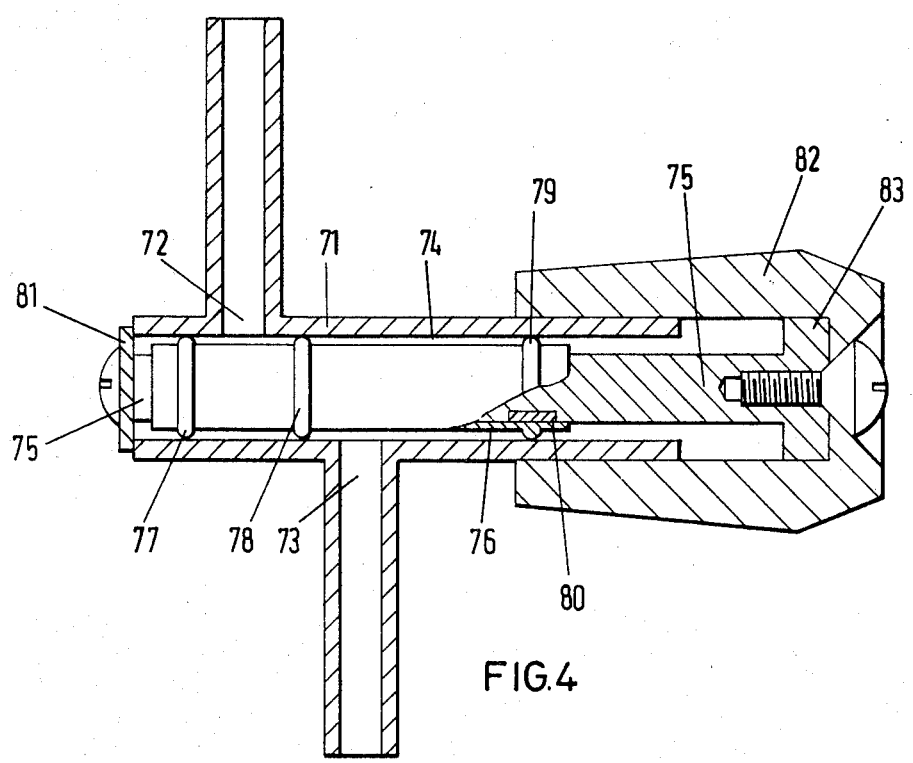
FIG. 4 is a part section through on/off valve.

The valve illustrated in FIG. 4 is a simple on/off plug valve, and comprises a body 71 having two ports 72, 73 and a cylindrical bore 74 in which is located a spindle. The spindle comprises a mandrel 75 having around it a protective sleeve 76 having three ridges 77, 78, 79. Each of these ridges overlies a resilient substrate 80 for biasing it against the bore to form a seal. The two outer seals 77, 79 define the outer limits of the utilised space between the spindle and the bore, and the intermediate seal divides this space into two parts. At one end of the mandrel is screwed a plate 81, and at the other end, a cap 82 is located over shoulders 83 and secured to the mandrel in substantially the same manner as shown in the previous drawings. This cap 82 differs from those of the previous drawings, however, by being a sliding fit on the valve body instead of being screwed thereto. The spindle is thus free to slide along the bore.

As depicted in FIG. 4, the valve is in the off position. Movement to the right is prevented by the end plate 81 abutting the end of the body. To turn the valve on, the spindle is slid along the bore to the left until the shoulders 83 abut the end of the body. In doing so the intermediate seal crosses the upper port 72, whereby that port becomes interconnected with the other port 73. To turn the valve off again, the spindle is slid to the right until further movement is prevented by the plate 81 abutting the end of the body.

Figure 5:
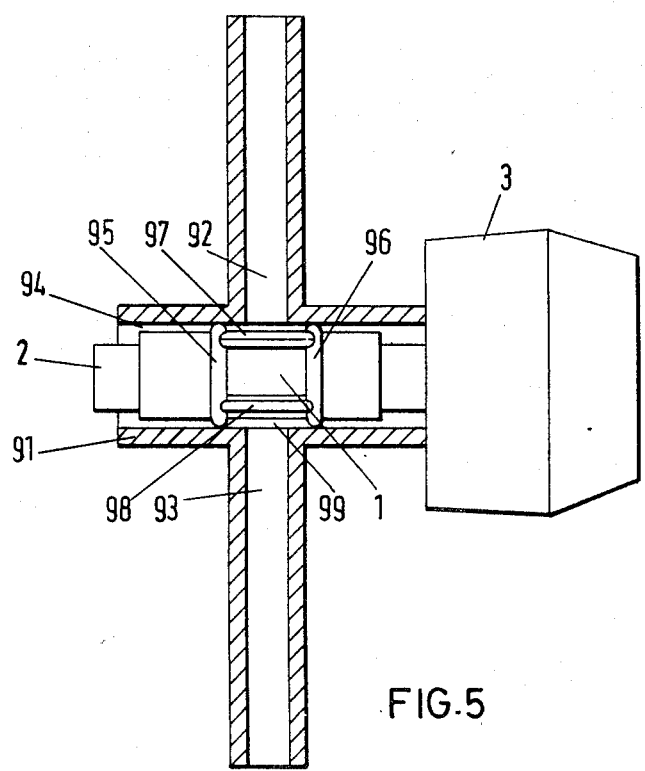
FIG. 5 is a part section through a further on/off valve.

The valve shown in FIG. 5 is a further on/off valve, but is operated by rotation of the spindle. The valve body 91 has two ports 82, 93 in line with each other, and a bore 94 containing a spindle. The spindle has a sleeve with two ridges 95, 96 extending right round the spindle in parallel plane orthogonal to the spindle axis. These two ridges lie either side the two ports, and isolate a part of the space between the spindle and the bore, into which part the two ports open. These two circumferential ridges are interconnected by two axial ridges 97, 98 spaced apart by a distance greater than the width of the ports but less than half the circumference. Thus the enclosed space defined by the circumferential ridges is divided into two passages 99, 1 of unequal length. The sleeve overlies a mandrel 2 with a resilient substrate between them biasing the ridges against the bore as described for the previous drawings. A cap 3 is secured to the end of the mandrel with short screw threads so that it can rotate freely without axial movement, as described for the valve of FIG. 3.

In operation, the spindle is rotated until both ports communicate with the longer flow passage 99, as shown in FIG. 5, this being the "on" position. Further rotation to bring the shorter passage 1 in line with one of the ports isolates that port, thereby providing the off position.

I claim:

1. A plug valve comprising a valve body having a bore and a plurality of radial ports communicating with the bore, and a spindle located within the bore,
the spindle comprising a mandrel having around it a plastics sleeve with integral upstanding ridges standing proud of the rest of the sleeve surface between the ridges, each ridge overlying a resilient substrate between the mandrel and the sleeve, the free diameter of the spindle being greater than the diameter of the bore so that when the spindle is assembled in the bore the resilient substrate becomes compressed and biases the ridges against the bore to form sliding seals between the spindle and the bore, the diameter of the spindle in the areas between the ridges being less than the diameter of the bore to provide space for fluid to flow therebetween when passing from one port to another, the configuration of the ridges being arranged to divide said space between the spindle and the bore and define at least one discrete passage alignable with selected ports to permit fluid flow therebetween.

2. A valve according to claim 1, in which the sleeve is keyed to the mandrel.

3. A valve according to claim 1, in which the resilient substrate is in the form of a single inner sleeve positioned to bias all the ridges against the bore simultaneously.

4. A valve according to claim 1, in which the sleeve has a plurality of discrete ridges and the substrate compises a plurality of separate resilient portions inserted into the mandrel surface, the surface of each insert being flush with or below the level of the mandrel surface.

5. A valve according to claim 4 in which the resilient inserts are of rectangular section, each being located in a rectangular sectioned slot of similar dimensions to those of the insert.

6. A valve according to claim 1, wherein the body has at least three ports and the spindle ridges are arranged to define one or more flow passages alignable with selected ports, the spindle being movable between at least two different positions in which the flow passages interconnect different ports to permit fluid flow therebetween, whereby the valve has a mulltiway function in that the different positions of the spindle provides a choice of flow paths through the valve between different ports.

7. A valve according to claim 1 wherein the body has two ports, and the spindle ridges define a flow passage alignable with the two ports simultaneously when in a first position, the spindle being movable to a second position wherein the flow passage is no longer in alignment with both ports, whereby the valve is operable between said first and second positions to provide on/-off control of fluid flowing therethrough.

8. A valve according to claim 1, which is provided with ridges to form terminal seals outside all the ports, with intermediate ridges to subdivide the space between the spindle and the bore as bounded by the terminal seals.

* * * * *